Dec. 13, 1938.  A. W. MOZIER  2,140,328
VALVE CONSTRUCTION
Filed Aug. 5, 1936
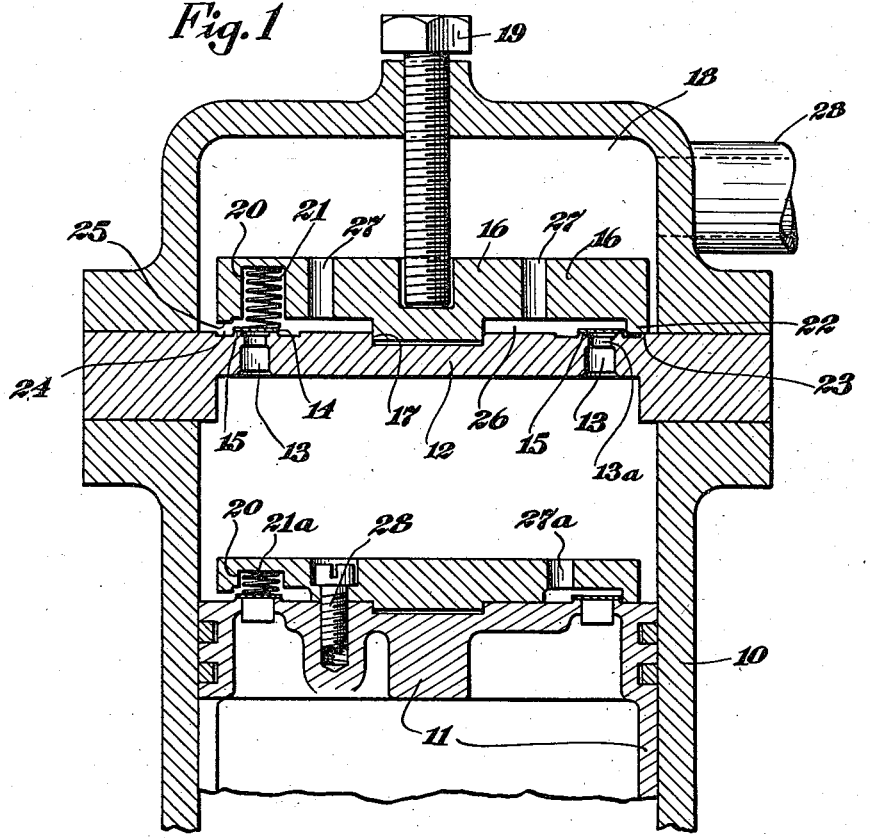
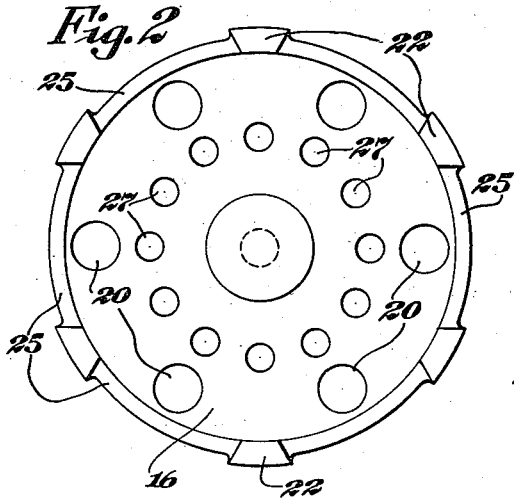
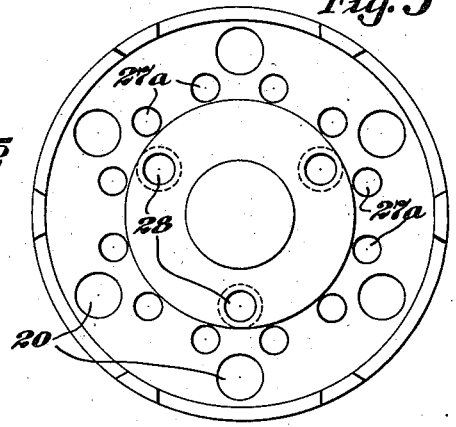
INVENTOR.
ALBERT WILLIAMS MOZIER
BY Herman Seid
ATTORNEY.

Patented Dec. 13, 1938

2,140,328

UNITED STATES PATENT OFFICE 2,140,328

VALVE CONSTRUCTION

Albert Williams Mozier, Plainfield, N. J., assignor, by mesne assignments, to Carrier Corporation, Newark, N. J., a corporation of Delaware Application August 5, 1936, Serial No. 94,353

2 Claims. (Cl. 251—119)

This invention relates to valves, and more particularly to valves employed in fluid compressors.

In the past, considerable difficulty has been experienced with compressor valves of the annular ring type because of their tendency to be noisy in operation. While relatively quiet operation may be obtained by using thin and flexible "featherweight" valves, these valves are not very durable or reliable, and must frequently be replaced. From the standpoint of reliability and continuity of performance, it has been preferred to use relatively rigid and heavy valves, although they are noisier in operation than the featherweight valves. The general object of the present invention is to provide an improved valve construction in which relatively rigid and heavy valve rings may be employed, but which will be extremely quiet in operation.

Another object of the invention is to provide a valve construction which is efficient, as well as quiet in operation.

Another object of the invention is to provide a quiet valve which is relatively simple and inexpensive to manufacture, and which is reliable in operation.

Another object of the invention is to provide an improved valve construction adapted to be employed in substantially the same form for controlling the admission of gas to a compression cylinder or the like, and for controlling the discharge of gas therefrom.

It is another object of the invention to provide a method of regulating gas flow whereby the operation of a check valve governing the directional flow of the gas is rendered extremely quiet.

Other objects, advantages and features of the invention will be more apparent from the following description of an illustrative form of the invention, to be read in connection with the accompanying drawing, in which:

Fig. 1 is a fragmentary vertical section through a reciprocating compressor embodying the invention;

Fig. 2 is a bottom view, in plan, of the discharge valve guide; and

Fig. 3 is a bottom view, in plan, of the suction valve guide.

Referring now to the drawing, 10 designates a compression cylinder within which a piston 11 reciprocates. At the top of the cylinder 10 is a discharge valve plate 12 having formed therein a plurality of passages 13, and an annular passage 13a, in communication with the passages 13. Valve 14 is carried on valve seat 15 formed on the upper side of valve plate 12 in a manner which is well known in the art, and which, therefore, is deemed sufficiently disclosed by the drawing. The valve 14 comprises a flat annular ring and may be formed of any desired material. In practice, the valve rings made of chrome vanadium steel have proven highly satisfactory.

Mounted above valve plate 12 is valve guide member 16, the central portion of which is preferably recessed within the center of valve plate 12, as shown at 17, securely to center the guide 16 with respect to plate 12. Guide member 16 is held in position against valve plate 12 in any desired manner, as, for example, by bolt 19 extending through the housing of the cylinder and through gas discharge chamber 18. Formed within the guide member 16 are a plurality of chambers 20 in which are positioned springs 21 which act on valve 14 and tend to force the valve against its seat. Around the periphery of member 16, and extending downwardly therefrom are formed a plurality of feet 22. These feet rest on valve plate 12, as shown at 23. Since these feet are spaced from each other and separate valve plate 12 from member 16, the spaces between the feet form gas passages 24 through which gas may flow radially outwardly to discharge chamber 18 when the valve 14 is raised from its seat. Partially to restrict passages 24, and to guide valve 14 in its travel, applicant provides lips 25. extending downwardly from member 16 and extending arcuately between the feet 22. The distance through which the lips 25 extend downwardly from member 16 preferably approximates the thickness of valve 14. A slight clearance is provided between the valve 14 and the lips 25, and between the valve 14 and the feet 22.

Member 16 is so formed as to provide, in combination with valve plate 12, an annular chamber 26 into which gas passes from passage 13a when valve 14 is raised. A plurality of passages 27 are formed in and extend through member 16, providing communication between chamber 26 and discharge chamber 18. It will be seen, therefore, that applicant has provided what may be termed a "hooded" valve, in which gas is not discharged directly into a discharge passage, such as 18, but is discharged into an intermediate passageway.

The valve is designed to provide restriction of gas flow beyond the end of passage 13a. This restriction may be effected by controlling the number and/or dimensions of the passages through which gas passes after it has passed through passage 13a, or by controlling the valve lift (i. e., the distance through which the valve travels).

The inlet or suction valve, formed at the top of piston 11, and secured thereto by bolts 28, is substantially the same as the discharge valve construction just described. It may be observed, however, that the springs 21a are preferably not as strong as the springs 21 of the discharge construction, and that the passages 27a may, if desired, be somewhat shorter than the passages 27.

It is to be understood, of course, that the piston 11 is reciprocated within the cylinder 10 in any desired manner, as by a connecting rod, and that gas to be compressed is supplied to the cylinder 10 below the piston through any suitable inlet passage or conduit. Compressed gas is discharged from chamber 18 through conduit 28.

While the constructions described above and illustrated in the accompanying drawing are well adapted to be used in connection with the compression of refrigerant vapor, it is to be understood that the invention is not limited to such use, but lends itself to a wide variety of applications.

Since many modifications of the invention may be made without departing from the scope thereof, it is to be understood that the foregoing description and accompanying drawing are to be regarded as illustrative only, applicant limiting himself only as indicated in the accompanying claims.

I claim:

1. In an apparatus of the character described, a cover member, a valve guide member mounted adjacent said cover member, gas port means formed in said cover member, an annular disc valve adapted to control gas flow through said port means, spring means for urging said valve toward said port means, a chamber formed between said cover member and said guide member, the outside diameter of said chamber being approximately equal to the outside diameter of said valve, said chamber being adapted to receive gas from said port means subsequent to the opening of said valve, and a plurality of passages for discharging gas delivered through said port means upon opening of said valve, at least some of said passages being formed between said cover member and guide member and extending radially outwardly from said chamber, the total area of all of said passages being less than the area for gas flow afforded by maximum opening of said valve, whereby flow of gas delivered from said valve is restricted.

2. In a fluid pumping mechanism, a cover member, a valve guide member mounted adjacent said cover member, gas port means formed in said cover member, an annular disc valve adapted to control gas flow through said port means, said cover member and said guide member being formed and arranged to provide an annular chamber between said members and to provide a plurality of passages extending radially outwardly from said chamber, arcuate ridge means arranged in each of said passageways for restricting gas flow from said chamber through said passageways subsequent to the opening of said disc valve, said arcuate ridge means being formed by portions of at least one of said members, spring means for urging said disc valve towards closed position and a plurality of passages formed through the body of said guide member for delivering gas from said annular chamber, the total free area for gas flow afforded by said last-mentioned passages and said radial passages being smaller than the area provided for gas flow by maximum opening of said valve and serving to restrict the flow of gas delivered from said valve.

ALBERT WILLIAMS MOZIER.